US009315108B2

(12) United States Patent
Yokoyama et al.

(10) Patent No.: US 9,315,108 B2
(45) Date of Patent: Apr. 19, 2016

(54) VEHICLE FUNCTION DETERMINATION

(71) Applicant: TOYOTA JIDOSHA KABUSHIKI KAISHA, Toyota-shi, Aichi-ken (JP)

(72) Inventors: Akihisa Yokoyama, Mountain View, CA (US); Takayuki Shimizu, Mountain View, CA (US); Kunihiko Kumita, Toyota (JP); Tomoya Ohno, Toyota (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/326,093

(22) Filed: Jul. 8, 2014

(65) Prior Publication Data

US 2016/0009188 A1 Jan. 14, 2016

(51) Int. Cl.
*G01C 21/26* (2006.01)
*B60L 11/18* (2006.01)

(52) U.S. Cl.
CPC .................................. *B60L 11/1809* (2013.01)

(58) Field of Classification Search
CPC B60L 11/1824; B60L 11/1838; B60L 11/184
See application file for complete search history.

(56) References Cited

U.S. PATENT DOCUMENTS

2007/0010933 A1* 1/2007 Hochkirchen et al. ........ 701/117
2008/0039980 A1* 2/2008 Pollack ............... B60L 11/1824 700/295
2010/0036601 A1* 2/2010 Ozawa et al. ................. 701/201
2010/0094496 A1* 4/2010 Hershkovitz .............. B60L 3/12 701/22
2010/0179704 A1* 7/2010 Ozog ............... G06Q 10/06315 700/291
2011/0130885 A1* 6/2011 Bowen ...................... B60L 3/12 700/291
2011/0202192 A1* 8/2011 Kempton ...................... 700/291
2011/0231028 A1* 9/2011 Ozog ..................... G06Q 10/06 700/291
2011/0276194 A1* 11/2011 Emalfarb ............ B60L 11/1838 700/297
2011/0278920 A1* 11/2011 Sakamoto ................. B60L 1/00 307/10.1
2012/0233077 A1* 9/2012 Tate, Jr. ............... B60L 11/1816 705/65
2012/0260206 A1* 10/2012 Cipollo ................... H04L 41/22 715/771
2012/0330494 A1* 12/2012 Hendrix .............. B60L 11/1838 701/29.3
2013/0096751 A1* 4/2013 Riley ........................ B60L 3/12 701/22
2013/0103191 A1* 4/2013 Bouman ............. B60L 11/1809 700/244
2013/0103378 A1* 4/2013 Tinnakornsrisuphap et al. ............................... 703/18
2013/0179061 A1* 7/2013 Gadh .................. B60L 11/1842 701/123
2013/0191321 A1* 7/2013 Lovett ................ B60L 11/1838 706/58

(Continued)

FOREIGN PATENT DOCUMENTS

JP 2013050902 A 3/2013
JP 201305092 A 7/2013

OTHER PUBLICATIONS

International Search Report and Written Opinion, as issued in connection with International Patent Application No. PCT/JP2014/004908, mailed May 22, 2015, 12 pgs.

*Primary Examiner* — Jonathan M Dager
(74) *Attorney, Agent, or Firm* — Burbage Law, P.C.; Jon Burbage

(57) ABSTRACT

The disclosure includes a system and method for performing one or more vehicle functions associated with a vehicle. The system includes a processor and a memory storing instructions that, when executed, cause the system to: receive sensor data indicating that a vehicle has arrived at a destination location; determine a synchronized arrival time describing when the vehicle arrived at the destination location, the synchronized arrival time determined based in part on the sensor data; and determine one or more vehicle functions associated with the vehicle based in part on the synchronized arrival time.

27 Claims, 10 Drawing Sheets

(56) References Cited

U.S. PATENT DOCUMENTS

2013/0217409 A1* 8/2013 Bridges ............... B60L 11/1842 455/456.1
2014/0006137 A1* 1/2014 Melen ............... G06Q 10/1093 705/14.35
2014/0091747 A1* 4/2014 Uyeki ................... B60L 11/184 320/101
2014/0129040 A1* 5/2014 Emadi .................... G06Q 50/06 700/291
2014/0203077 A1* 7/2014 Gadh ........................ H02J 7/00 235/382
2014/0312841 A1* 10/2014 Baba ......................... H02J 3/32 320/109
2014/0354227 A1* 12/2014 Tyagi .................. B60L 11/1844 320/109
2014/0354228 A1* 12/2014 Williams ............ B60L 11/1844 320/109
2015/0054466 A1* 2/2015 Kinomura ............... H02J 7/007 320/134
2015/0061592 A1* 3/2015 Nakasone ............... B60L 1/003 320/109
2015/0224891 A1* 8/2015 Petrosian ............ B60L 11/1851 701/31.4
2015/0283912 A1* 10/2015 Shimizu .............. B60L 11/1862 320/157
2015/0298555 A1* 10/2015 Bennett ............... B60L 11/1861 701/22

* cited by examiner

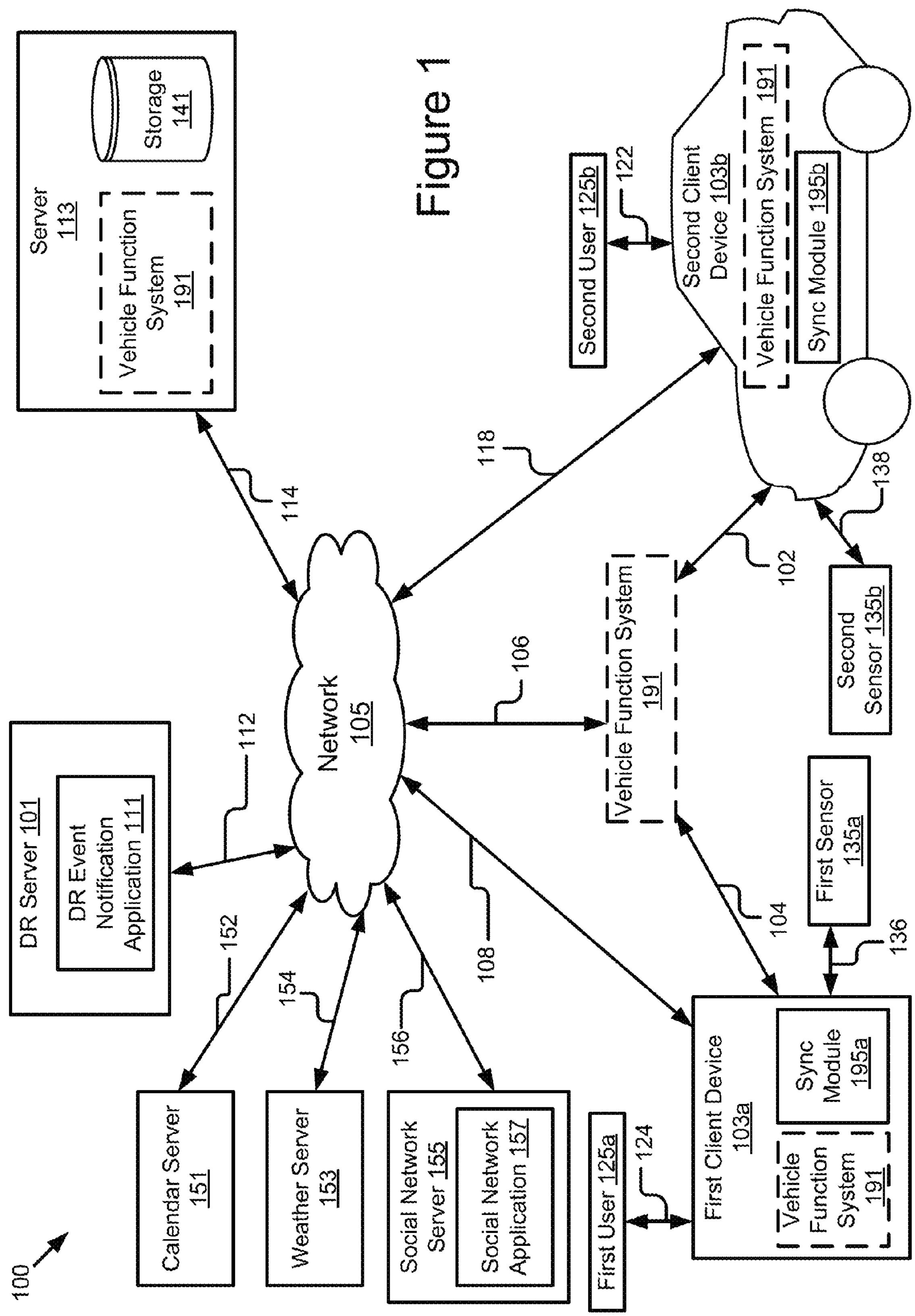
Figure 1
100
Server 113
Vehicle Function System 191
Storage 141
DR Server 101
DR Event Notification Application 111
Network 105
Vehicle Function System 191
Second Client Device 103b
Vehicle Function System 191
Sync Module 195b
Second User 125b
Second Sensor 135b
First Sensor 135a
First Client Device 103a
Sync Module 195a
Vehicle Function System 191
First User 125a
Calendar Server 151
Weather Server 153
Social Network Server 155
Social Network Application 157
102
104
106
108
112
114
118
122
124
136
138
152
154
156

880

| | | Arrival Time | | | |
|---|---|---|---|---|---|
| | | 0:00-6:00 | 6:00-12:00 | 12:00-18:00 | 18:00-24:00 |
| Departure Time | 0:00-6:00 | 0 | 0 | 0.04 | 0.08 |
| | 6:00-12:00 | 0 | 0 | 0.16 | 0.36 |
| | 12:00-16:00 | 0 | 0.2 | 0.14 | 0 |
| | 18:00-24:00 | 0 | 0 | 0.02 | 0 |

VEHICLE FUNCTION DETERMINATION

BACKGROUND

The specification relates to providing vehicle services to users. In particular, the specification relates to determining vehicle functions based in part on synchronized vehicle arrival times.

As more and more people favor clean and sustainable energy, the usage of electric vehicles and/or hybrid electric vehicles grows dramatically. Existing charging solutions may begin to charge a vehicle as soon as the vehicle is connected to a power source wirelessly or via a charging cable. Existing charging solutions may fail to consider other factors when charging the vehicle. For example, existing charging solutions fails to consider demand response (DR) events in the electricity grid system and a user's historical pattern of driving behavior when considering charging the vehicle.

SUMMARY

According to one innovative aspect of the subject matter described in this disclosure, a system for performing one or more vehicle functions includes a processor and a memory storing instructions that, when executed, cause the system to: receive sensor data indicating that a vehicle has arrived at a destination location; determine a synchronized arrival time describing when the vehicle arrived at the destination location, the synchronized arrival time determined based in part on the sensor data; and determine one or more vehicle functions associated with the vehicle based in part on the synchronized arrival time.

In general, another innovative aspect of the subject matter described in this disclosure may be embodied in methods that include: receiving sensor data indicating that a vehicle has arrived at a destination location; determining a synchronized arrival time describing when the vehicle arrived at the destination location, the synchronized arrival time determined based in part on the sensor data; and determining one or more vehicle functions associated with the vehicle based in part on the synchronized arrival time.

Other aspects include corresponding methods, systems, apparatus, and computer program products for these and other innovative aspects.

These and other implementations may each optionally include one or more of the following operations and features. For instance, the features include: estimating departure time data associated with the vehicle based in part on the synchronized arrival time; determining the one or more vehicle functions based in part on the departure time data; determining a distribution pattern describing a relationship between arrival times and departure times; estimating the departure time data based in part on the distribution pattern and the synchronized arrival time; the distribution pattern including a probability density distribution table; the departure time data including a departure time range; determining that the departure time range indicates the vehicle departs from the destination location after a predetermined time window; determining a distribution pattern describing relationship between arrival times and departure times; estimating a departure time satisfying the departure time range based in part on the synchronized arrival time and the distribution pattern; determining the one or more vehicle functions to be performed at the destination location based in part on the estimated departure time; the departure time data including an estimated departure time describing when the vehicle departs from the destination location; the one or more vehicle functions including charging the vehicle; determining a charging completion time as a time before the estimated departure time; receiving DR event data; analyzing the DR event data to determine one or more DR requirements; determining available time slots for charging the vehicle based in part on the one or more DR requirements and the charging completion time; retrieving price data associated with the available time slots; determining a target state of charge for a battery associated with the vehicle; selecting one or more charging time slots from the available time slots based in part on the target state of charge and the price data; assigning the one or more charging time slots to the vehicle; and the one or more vehicle functions including one or more of charging the vehicle, controlling temperature in the vehicle, transferring data between the vehicle and a server, and transferring data between the vehicle and a client device.

The present disclosure can be particularly advantageous in a number of respects. First, the system can determine vehicle functions for a vehicle in a way that the performance of the vehicle functions not only conforms to requirements in the system, but also satisfies a user's usage need of the vehicle. For example, the system can control the charge of a vehicle based in part on DR event requirements in the electricity grid system and a user's usage pattern of the vehicle. An example usage pattern of the vehicle can be described by a distribution pattern that describes a relationship between arrival times and departure times associated with a destination location. The system can determine charging time slots that have lower power rates to charge the vehicle while satisfying the DR event requirements and the user's usage pattern of the vehicle.

More specifically, the system can estimate departure time data describing a departure time range or a specific departure time describing when the vehicle may depart from the destination location. The departure time data can be estimated based in part on a distribution pattern (e.g., a distribution probability density table) and a synchronized arrival time at the destination location. The system can determine vehicle functions based in part on the departure time data.

Second, the system can determine and implement various vehicle functions including, but not limited to, charging a vehicle, controlling temperature in the vehicle, transferring data between the vehicle and a server, transferring data between the vehicle and a client device and vehicle network optimization, etc. The example advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

FIG. 1 is a block diagram illustrating an example system for performing one or more vehicle functions.

FIG. 8C is a graphic representation illustrating an example probability density distribution table.

DETAILED DESCRIPTION

System Overview

Figure 2:
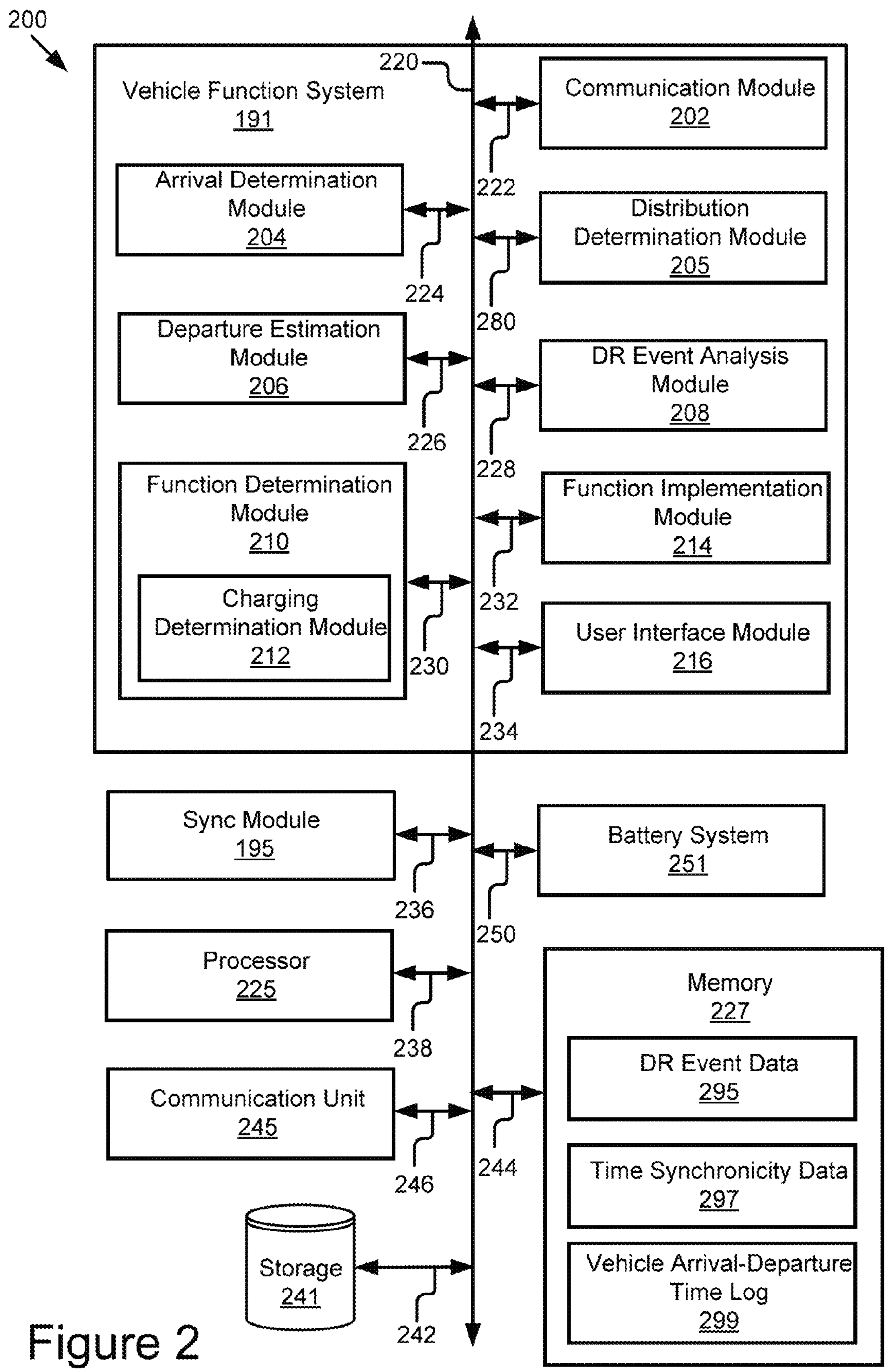
FIG. 2 is a block diagram illustrating an example of a vehicle function system.

FIG. 1 illustrates a block diagram of some implementations of a system 100 for performing one or more vehicle functions. The illustrated system 100 includes a first client device 103*a* and a second client device 103*b* (also referred to herein individually and collectively as client device 103) that can be accessed by users 125*a* and 125*b* (also referred to herein individually and collectively as user 125). The system 100 also includes a DR server 101, a server 113, a calendar server 151, a weather server 153, a social network server 155, and a vehicle function system 191. In the illustrated implementation, these entities of the system 100 are communicatively coupled via a network 105. The system 100 may include other servers or devices not shown in FIG. 1 including, for example, a traffic server for providing traffic data, a power service server for providing power usage service (e.g., billing service), a map server for providing map data and a content server for providing content (e.g., music, videos, podcasts, etc.), etc.

The client devices 103*a*, 103*b* in FIG. 1 can be used by way of example. While FIG. 1 illustrates two client devices 103*a* and 103*b*, the present disclosure applies to a system architecture having one or more client devices 103. Furthermore, although FIG. 1 illustrates one network 105 coupled to the client devices 103, the DR server 101, the server 113, the calendar server 151, the weather server 153, the social network server 155, and the vehicle function system 191, in practice, one or more networks 105 can be connected to these entities. Furthermore, while FIG. 1 includes one DR server 101, one server 113, one calendar server 151, one weather server 153, one social network server 155, the system 100 could include one or more DR servers 101, one or more servers 113, one or more calendar servers 151, one or more weather servers 153, and one or more social network servers 155. In addition, the separation of various components and servers in the implementations described herein should not be understood as requiring such separation in all implementations, and it should be understood that the described components, devices or servers can generally be integrated together in a single component, device or server.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, e-mail, etc.

The vehicle function system 191 can be a system for performing vehicle functions. For example, the vehicle function system 191 includes code and routines for determining and performing vehicle functions at a destination location based in part on vehicle arrival time data associated with the destination location. In some implementations, the vehicle function system 191 can be implemented using hardware including a field-programmable gate array ("FPGA") or an application-specific integrated circuit ("ASIC"). In some other implementations, the vehicle function system 191 can be implemented using a combination of hardware and software.

A vehicle function can be a function performed in a vehicle. For example, a vehicle function can be charging a vehicle, controlling temperature in the vehicle (e.g., turning air-conditioner on or off, turning heat on or off), transferring data between the vehicle and a server (e.g., downloading videos, music, podcasts, map updates, etc. from the server to the vehicle; uploading journey data stored in the vehicle to a cloud storage device), and transferring data between the vehicle and the client device 103 (e.g., transferring user calendar data from the user's smartphone to the vehicle), etc.

In some implementations, the vehicle function system 191 can be an independent system that connects to the network 105 via signal line 106, the first client device 103*a* via signal line 104, and the second client device 103*b* via signal line 102. In some other implementations, the vehicle function system 191 may be stored in a combination of the devices and servers, or in one of the devices or servers. The vehicle function system 191 is described in further detail below with reference to FIGS. 2-7.

In some implementations, the vehicle function system 191 can be operable on the server 113. The server 113 can be a hardware server that includes a processor, a memory, and network communication capabilities. In the illustrated implementation, the server 113 is coupled to the network 105 via signal line 114. The server 113 sends and receives data to and from other entities of the system 100 via the network 105. The server 113 includes a storage device 141 for storing data to provide the functionality described herein. The storage device 141 is described below in more detail.

In some implementations, the vehicle function system 191 can be operable on the first client device 103*a*. The first client device 103*a* may be a computing device that includes a memory and a processor, for example, a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 105. In some implementations, the first client device 103*a* includes a sync module 195*a* for synchronizing data between the first client device 103*a* and one or more of the server 113, the DR server 101, and the second client device 103*b*. The sync module 195*a* is described below in more detail. In some implementations, the vehicle function system 191 acts in part as a thin-client application that may be stored on the first client device 103*a* and in part as components that may be stored on one or more of the server 113 and the second client device 103*b*.

In the illustrated implementation, the first client device 103*a* is communicatively coupled to the network 105 via signal line 108. The user 125*a* interacts with the first client device 103*a* via signal line 124. The first client device 103*a* is communicatively coupled to a first sensor 135*a* via signal line 136. The first sensor 135*a* is described below in more detail.

In some implementations, the vehicle function system 191 can be operable on the second client device 103*b*. The second client device 103*b* can be a mobile computer system. For example, the second client device 103*b* can be one of a vehicle, an automobile, a bus, a bionic implant, or any other mobile system with non-transitory computer electronics. In some implementations, the second client device 103*b* may have similar structure and provide similar functionality as the first client device 103*a*. For example, the second client device 103*b* can also be a laptop computer, a desktop computer, a tablet computer, a mobile telephone, a personal digital assistant ("PDA"), a mobile e-mail device, a portable game player, a portable music player, a television with one or more processors embedded therein, or coupled thereto or other electronic device capable of accessing a network 105. The second client device 103*b* includes a sync module 195*b* for synchronizing data between the second client device 103 and one or more of the first client device 103*a*, the DR server 101, and the server 113.

In the illustrated implementation, the second client device 103*b* is communicatively coupled to a second sensor 135*b* via signal line 138. The second client device 103*b* is communicatively coupled to the network 105 via signal line 118. The second user 125*b* interacts with the second client device 103*b* via signal line 122. In some implementations, the first user 125*a* and the second user 125*b* can be the same user 125 interacting with both the first client device 103*a* and the second client device 103*b*. For example, the user 125 can be a passenger sitting in the second client device 103*b* (e.g., a vehicle) and operating on the first client device 103*a* (e.g., a smartphone). In another example, the user 125 can be a driver driving a vehicle.

The first sensor 135*a* and the second sensor 135*b* (referred to individually and collectively as sensor 135) can be any type of conventional sensors configured to collect any type of data. For example, the sensors 135*a*, 135*b* each can be one of a navigation sensor (e.g., a global positioning system (GPS) sensor), an infrared detector, a motion detector, a thermostat, a sound detector, and any other type of sensors. Although two sensors 135*a*, 135*b* are illustrated in FIG. 1, the system 100 can include one or more sensors 135.

In some implementations, the system 100 can include a combination of different types of sensors 135. For example, the system 100 includes different sensors 135 for measuring one or more of a current time, a location of the client device 103 (e.g., a latitude, longitude, and altitude of a location), an acceleration of a vehicle, a velocity of a vehicle, a fuel tank level, and a battery level of a vehicle, etc. The sensors 135 generate sensor data describing the one or more measurements and send the sensor data to the vehicle function system 191.

The sync modules 195*a*, 195*b* (referred to individually and collectively as sync module 195) each can include code and routines for synchronizing data stored in a client device 103 with data stored in one or more of the server 113, the DR server 101, and another client device 103. For example, the sync module 195 synchronizes local DR event data stored in a client device 103 with corresponding cloud data stored in the DR server 101. In another example, the sync module 195 synchronizes local time synchronicity data and local vehicle arrival-departure time log data stored in a client device 103 with corresponding cloud data stored in the storage device 141 of the server 113.

The storage device 141 can be a non-transitory storage medium that stores data for providing the functionality described herein. The storage device 141 may be a dynamic random access memory (DRAM) device, a static random access memory (SRAM) device, flash memory, or some other memory devices. In some implementations, the storage device 141 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage device 141 stores time synchronicity data, user journey data, user profile data, and other data associated with users in the server 113. The user journey data associated with a user can be data describing journeys taken by the user. For example, the user journey data includes data describing one or more of a start point, an end point, time of departure from the start point, time of arrival at the end point, a route, a duration, a direction, etc. associated with a journey taken by a user. In another example, the user journey data includes vehicle arrival-departure time log. Other example user journey data is possible. The vehicle arrival-departure time log and time synchronicity data are described below in more detail.

The user profile data can be data describing user profiles. For example, user profile data associated with a user includes a user name, an e-mail address, user preferences, hobbies, interests, education experience, working experience, and other demographic data describing the user, etc. Other example user profile data is possible.

The demand response (DR) server 101 can be a hardware server that includes a processor, a memory, and network communication capabilities. In the illustrated implementation, the DR server 101 is coupled to the network 105 via signal line 112. The DR server 101 sends and receives data to and from one or more of the client devices 103, the server 113, and the vehicle function system 191 via the network 105. For example, the DR server 101 sends DR events to the vehicle function system 191 via the network 105.

Demand response ("DR") may be described as the changes in electricity usage by end-use customers from their normal consumption patterns in response to changes in the price of electricity over time. DR may also relate to incentive payments designed to induce lower electricity use at times of high wholesale market prices or when the electricity grid is unreliable. DR includes all intentional modifications to consumption patterns of electricity of end-use customers that are intended to alter the timing, level of instantaneous demand, or the total electricity consumption.

In the illustrated implementation, the DR server 101 includes a DR event notification application 111. The DR event notification application 111 can be code and routines for generating DR events and notifying users of the DR events. The DR event notification application 111 sends DR event data describing DR events to the vehicle function system 191. A DR event may be an event relating to DR in an electricity grid system. For example, a DR event may be an event indicating that the price for electricity is scheduled to increase at a certain time and that the client devices 103 may reduce their consumption of electricity to a specific usage. In some implementations, a DR event includes one or more DR requirements. For example, a DR event indicates the power usage between 6:00 PM and 11:00 PM at a user's home cannot exceed a predetermined amount of electricity. Other example requirements are possible.

The calendar server 151 can be a hardware server that includes a processor, a memory, and network communication capabilities. In the illustrated implementation, the calendar server 151 is coupled to the network 105 via signal line 152. The calendar server 151 sends and receives data to and from other entities of the system 100 via the network 105. For example, the calendar server 151 sends data describing a user's calendar to the vehicle function system 191 upon request and with permission from the user.

The weather server 153 can be a hardware server that includes a processor, a memory, and network communication capabilities. In the illustrated implementation, the weather server 153 is coupled to the network 105 via signal line 154. The weather server 153 sends and receives data to and from other entities of the system 100 via the network 105. For example, the weather server 153 sends weather data to the vehicle function system 191 upon request.

The social network server 155 can be a hardware server that includes a processor, a memory, and network communication capabilities. In the illustrated implementation, the social network server 155 is coupled to the network 105 via signal line 156. The social network server 155 sends and receives data to and from other entities of the system 100 via the network 105. The social network server 155 includes a social network application 157. A social network can be a type of social structure where the users 125 may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

It should be understood that the social network server 155 and the social network application 157 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

In some implementations, the social network includes a service that provides a social feed describing one or more social activities of a user 125. For example, the social feed includes one or more status updates for the user 125 describing the user's actions, expressed thoughts, expressed opinions, etc. In some implementations, the service provided by the social network application 157 can be referred to as a "social network service." Other implementations can be possible.

Example Vehicle Function System

Referring now to FIG. 2, an example of the vehicle function system 191 is shown in more detail. FIG. 2 is a block diagram of a computing device 200 that includes the vehicle function system 191, the sync module 195, a processor 225, a communication unit 245, a storage 241, a battery system 251, and a memory 227 according to some examples. The components of the computing device 200 are communicatively coupled by a bus 220. In some implementations, the computing device 200 can be one of the server 113, the first client device 103*a*, the second client device 103*b*, and another server or device that may include the vehicle function system 191. In the illustrated implementation, the sync module 195 is communicatively coupled to the bus 220 via signal line 236.

The processor 225 includes an arithmetic logic unit, a microprocessor, a general purpose controller, or some other processor array to perform computations and provide electronic display signals to a display device. The processor 225 is coupled to the bus 220 for communication with the other components via signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. Other processors, operating systems, sensors, displays, and physical configurations may be possible.

The memory 227 stores instructions or data that may be executed by the processor 225. The memory 227 is coupled to the bus 220 for communication with the other components via signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores DR event data 295, time synchronicity data 297, and vehicle arrival-departure time log 299. The DR event data 295 can be data describing one or more DR events. The time synchronicity data 297 can be data used to synchronize a time with a universal time. For example, the time synchronicity data 297 can be used to synchronize a vehicle arrival time or a vehicle departure time with a universal time.

An arrival time can be data describing when a vehicle arrives at a destination location. For example, an arrival time describes that a vehicle arrived home at 6:00 PM, Oct. 19, 2013. An arrival time can be synchronized with a universal time and referred to as a synchronized arrival time. A departure time can be data describing when a vehicle departs from a location. For example, a departure time describes that a vehicle departed from home at 8:00 AM, Oct. 20, 2013. The departure time can be synchronized with a universal time and referred to as a synchronized departure time. For example, a synchronized arrival time or departure time can be a local time synchronized with the Coordinated Universal Time (UTC) defined by International Telecommunications Union Recommendation (ITU-R TF.460-6) according to the local time zone. In another example, a synchronized arrival time or departure time can be a time synchronized by timekeeping technologies including GPS satellites and network time protocol (NTP). The network time protocol can be a networking protocol for clock synchronization between computer systems over packet-switched variable-latency data networks.

An association between an arrival time and a departure time describes that a vehicle arrives at a destination location at the arrival time and then departs from the destination location at the departure time. For example, an association between an arrival time and a departure time indicates that a vehicle arrived home at 5:30 PM, Oct. 1, 2013 and then left home in the next morning at 7:00 AM, Oct. 2, 2013. In another example, an association between an arrival time and a departure time indicates that a vehicle arrived home at 12:00 PM, Oct. 1, 2013 and then left home within the next three hours at 2:40 PM, Oct. 1, 2013.

The vehicle arrival-departure time log 299 records one or more of: (1) historical arrival times describing when a vehicle arrived at a location; (2) historical departure times describing when the vehicle departed from the location; and (3) associations between the historical arrival times and the historical departure times. In some implementations, the historical arrival times and departure times stored in the vehicle arrival-departure time log 299 are synchronized times.

The communication unit 245 transmits and receives data to and from at least one of the client devices 103*a*, 103*b* and the server 113 depending upon where the vehicle function system 191 may be stored. The communication unit 245 is coupled to the bus 220 via signal line 246. In some implementations, the communication unit 245 includes a port for direct physical connection to the network 105 or to another communication channel. For example, the communication unit 245 includes a USB, SD, CAT-5, or similar port for wired communication with the client devices 103. In some implementations, the communication unit 245 includes a wireless transceiver for exchanging data with the client devices 103 or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage 241 is communicatively coupled to the bus 220 via signal line 242.

In some implementations, the storage 241 provides similar functionality and stores similar data as the storage device 141. In some implementations, the storage 241 stores time synchronicity data 297, user journey data including the vehicle arrival-departure time log 299, user profile data, and other data associated with the user. In some examples, the storage 241 can be a cloud storage device in the server 113. In some other examples, the storage 241 can be a local storage device in the first client device 103*a* or the second client device 103*b*.

The battery system 251 can be a system that manages one or more batteries in a vehicle. For example, the battery system 251 includes code and routines for managing a state of charge for a battery in a vehicle. A state of charge describes a charge state of a battery. For example, a state of charge indicates a battery is empty or 0% charged. In another example, a state of charge indicates a battery is full or 100% charged. In yet another example, a state of charge indicates a battery is 30% charged. In some implementations, the battery system 251 determines a current state of charge for a battery in a vehicle. The battery system 251 is communicatively coupled to the bus 220 via signal line 250.

In the illustrated implementation shown in FIG. 2, the vehicle function system 191 includes a communication module 202, an arrival determination module 204, a distribution determination module 205, a departure estimation module 206, a DR event analysis module 208, a function determination module 210, a function implementation module 214, and a user interface module 216. These components of the vehicle function system 191 are communicatively coupled to each other via the bus 220. In some implementations, components of the vehicle function system 191 can be stored in a single server or device. In some other implementations, components of the vehicle function system 191 can be distributed and stored across multiple servers or devices.

The communication module 202 can be software including routines for handling communications between the vehicle function system 191 and other components of the computing device 200. In some implementations, the communication module 202 can be a set of instructions executable by the processor 225 to provide the functionality described below for handling communications between the vehicle function system 191 and other components of the computing device 200. In some implementations, the communication module 202 can be stored in the memory 227 of the computing device 200 and can be accessible and executable by the processor 225. The communication module 202 may be adapted for cooperation and communication with the processor 225 and other components of the computing device 200 via signal line 222.

The communication module 202 sends and receives data, via the communication unit 245, to and from one or more of the client device 103, the server 113, the DR server 101, the calendar server 151, the weather server 153, and the social network server 155. For example, the communication module 202 receives, via the communication unit 245, calendar data associated with a user from the calendar server 151 and sends the calendar data to the departure estimation module 206. In another example, the communication module 202 receives graphical data for providing a user interface to a user from the user interface module 216 and sends the graphical data to the client device 103, causing the client device 103 to present the user interface to the user.

In some implementations, the communication module 202 receives data from components of the vehicle function system 191 and stores the data in one or more of the storage 241 and the memory 227. For example, the communication module 202 receives data describing an arrival time of a vehicle at a destination location from the arrival determination module 204 and stores the data in the vehicle arrival-departure time log 299. In another example, the communication module 202 retrieves data from the storage 241 or the memory 227 and sends the data to one or more components of the vehicle function system 191. For example, the communication module 202 retrieves user preference data from the storage 241 and sends the user preference data to the function determination module 210.

In some implementations, the communication module 202 may handle communications between components of the vehicle function system 191. For example, the communication module 202 receives a synchronized arrival time from the arrival determination module 204 and sends the synchronized arrival time to one or more of the departure estimation module 206 and the function determination module 210.

The arrival determination module 204 can be software including routines for determining an arrival time describing when a vehicle arrives at a destination location. The arrival time can be a synchronized arrival time. In some implementations, the arrival determination module 204 can be a set of instructions executable by the processor 225 to provide the functionality described below for determining an arrival time describing when a vehicle arrives at a destination location. In some implementations, the arrival determination module 204 can be stored in the memory 227 of the computing device 200 and can be accessible and executable by the processor 225. The arrival determination module 204 may be adapted for cooperation and communication with the processor 225 and other components of the computing device 200 via signal line 224.

The arrival determination module 204 receives sensor data from one or more sensors 135. For example, the arrival determination module 204 receives GPS data indicating that a vehicle has arrived at a destination location from a GPS sensor. The sensor data may include location data describing the destination location and a timestamp indicating a time when the vehicle arrived at the destination location. Example destination locations include, but are not limited to, a user's home location, a user's work location, a hotel, a parking lot with charging stations, etc. Other example destination locations are possible.

The arrival determination module 204 determines a synchronized arrival time describing when the vehicle arrived at the destination location based in part on the sensor data. For example, the arrival determination module 204 determines a synchronized arrival time of the vehicle based in part on GPS data received from a GPS sensor. In some examples, the synchronized arrival time can be a most recent arrival time of the vehicle at the destination location. In some examples, the synchronized arrival time can be a current arrival time of the vehicle at the destination location. In some other examples, the synchronized arrival time can be a historical arrival time of the vehicle at the destination location.

In some implementations, the arrival determination module 204 sends the synchronized arrival time to one or more of the departure estimation module 206 and the function determination module 210. In some other implementations, the arrival determination module 204 stores the synchronized arrival time in the vehicle arrival-departure time log 299. When the vehicle departs from the destination location again, a synchronized departure time can also be stored in the vehicle arrival-departure time log 299 and be associated with the synchronized arrival time.

The distribution determination module 205 can be software including routines for determining distribution patterns describing relationships between arrival times and departure times. In some implementations, the distribution determination module 205 can be a set of instructions executable by the processor 225 to provide the functionality described below for determining distribution patterns describing relationships between arrival times and departure times. In some implementations, the distribution determination module 205 can be stored in the memory 227 of the computing device 200 and can be accessible and executable by the processor 225. The distribution determination module 205 may be adapted for cooperation and communication with the processor 225 and other components of the computing device 200 via signal line 280.

In some implementations, the distribution determination module 205 retrieves (1) historical arrival times each describing when a vehicle arrived at a destination location and (2) historical departure times each describing when the vehicle departed from the destination location again from the vehicle arrival-departure time log 299. Using the historical arrival times and the historical departure times, the distribution determination module 205 estimates one or more distribution patterns for the vehicle as described below. For example, for each vehicle and each destination location, the distribution determination module 205 may determine a first distribution pattern for weekdays, a second distribution pattern for weekends and a third distribution pattern for holidays. A distribution pattern can be data describing a relationship between vehicle arrival times and vehicle departure times at a location for a vehicle.

A departure time range can be data specifying a time window that a departure time of a vehicle satisfies. For example, a departure time range may describe one of: (1) a vehicle departs from a destination location again within a first predetermined time window (e.g., the vehicle departs from the destination location again within the next four hours upon arrival at the destination location); (2) the vehicle departs from the destination location after a second predetermined time window (e.g., the vehicle departs in the next morning or next one or more days, the vehicle departs after 8:00 in the next morning, etc. upon arrival at the destination location); and (3) uncertainty of the vehicle departure time (e.g., the vehicle may depart within the next few hours of the same day or in the next morning upon arrival at the destination location), etc.

Each departure time range can be associated with one arrival time range. An arrival time range can be a window including a series of arrival times. When a vehicle arrives at a destination location within an arrival time range, a departure time of the vehicle departing again from the destination location satisfies a departure time range associated with that arrival time range. For example, when a vehicle arrives at a destination location at 11:00 AM within an arrival time range (8:00 AM-12:00 PM), a departure time of the vehicle satisfies an associated departure time range describing that the vehicle will depart from the destination location within three hours.

In some implementations, the distribution pattern includes data describing associations between the arrival time ranges and the departure time ranges. For example, a distribution pattern describes that: (1) when a vehicle arrives at a destination location within a first arrival time range (e.g., 0:00 AM-8:00 AM), the vehicle will depart from the destination location again within a first predetermined time window (e.g., the vehicle will depart within the next four hours upon arrival); (2) when the vehicle arrives at the destination location within a second arrival time range (e.g., 8:00 AM-4:00 PM), it is uncertain when the vehicle will depart from the destination location again (e.g., it is uncertain whether the vehicle may depart within the next several hours or in the next morning); and (3) when the vehicle arrives at the destination location within a third arrival time range (e.g., 4:00 PM-0:00 AM), the vehicle will depart from the destination location after a second predetermined time window (e.g., the vehicle will stay overnight at the destination location and depart after 7:30 AM in the next morning), etc.

Different users may be associated with different distribution patterns. For example, a first distribution pattern associated with a first user indicates when the first user's vehicle arrives home between 4:00 PM and 6:00 PM, the first user's vehicle will leave home again within the next three hours after arrival. A second distribution pattern associated with a second user indicates when the second user's vehicle arrives home after 4:00 PM, the second user's vehicle will not leave home until 7:00 AM in the next morning. A third distribution pattern associated with a third user indicates when the third user's vehicle arrives home after 21:00, the third user's vehicle will not leave home until 8:00 AM in the next morning.

In some implementations, the distribution determination module 205 establishes a two dimensional (2D) coordinate system with a first coordinate (e.g., the x coordinate) representing the arrival time and a second coordinate (e.g., the y coordinate) representing the departure time. The distribution determination module 205 organizes historical arrival times and historical departure times associated with the vehicle and the destination location into time pairs, where each time pair includes a historical arrival time and an associated historical departure time. For example, a time pair (T1, T2) indicates the vehicle arrived at the destination location at the arrival time T1 and then departed from the destination location at the departure time T2. The distribution determination module 205 creates a distribution graphic by plotting all the time pairs as points in the 2D coordinate system. A distribution graphic can be a graphic illustrating how the time pairs are distributed in the 2D coordinate system. An example distribution graphic is illustrated with reference to FIG. 8B.

The distribution determination module 205 determines the distribution pattern for the vehicle by analyzing distribution of the time pairs in the 2D coordinate system. For example, the distribution determination module 205 determines different arrival time ranges that correspond to different departure time ranges from the distribution graphic, and generates a distribution pattern describing associations between the arrival time ranges and the departure time ranges. The distribution graphic can be a visual representation of the distribution pattern.

Figure 8A:
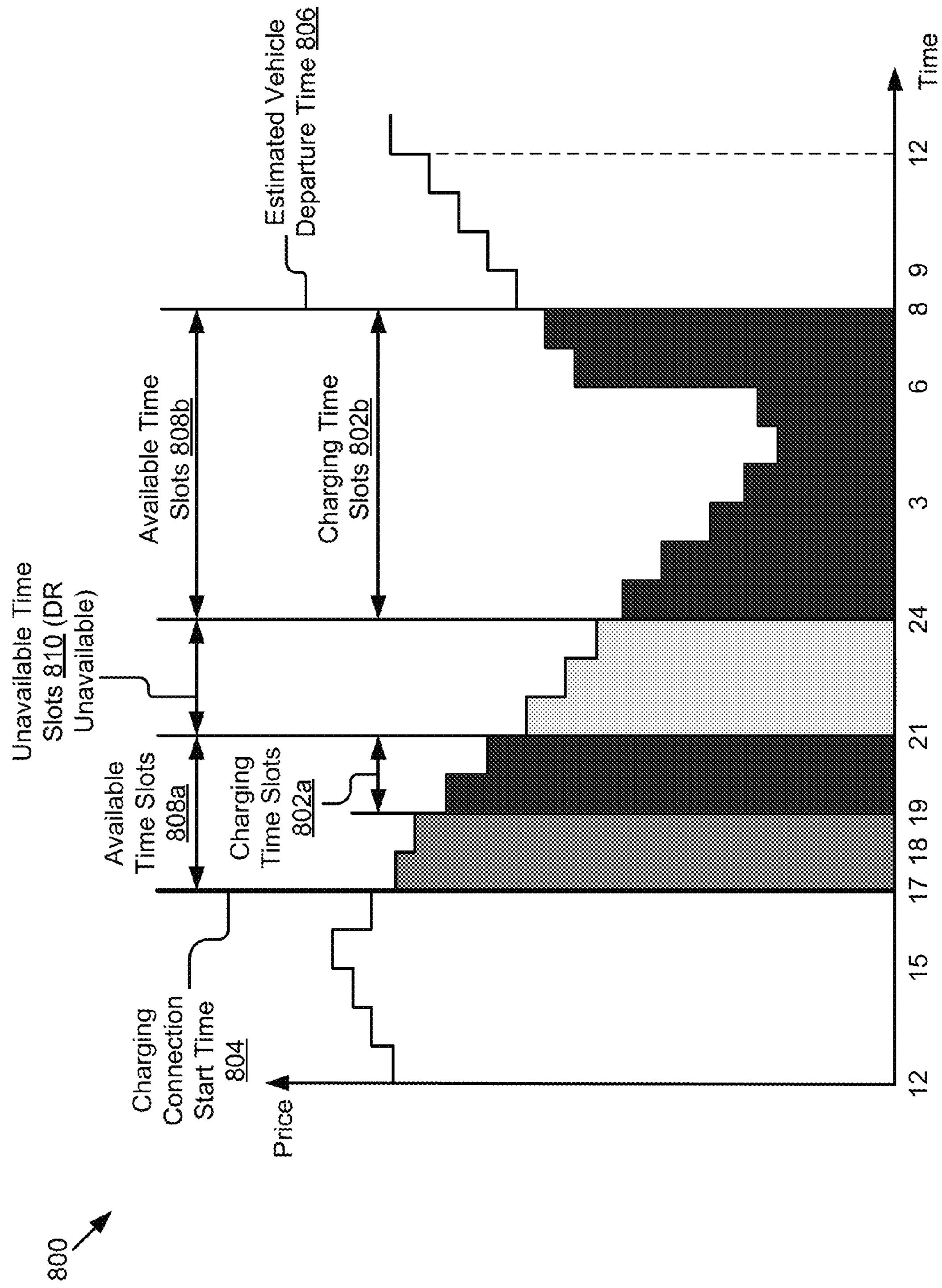
FIG. 8A is a graphic representation illustrating example charging time slots.
Figure 8B:
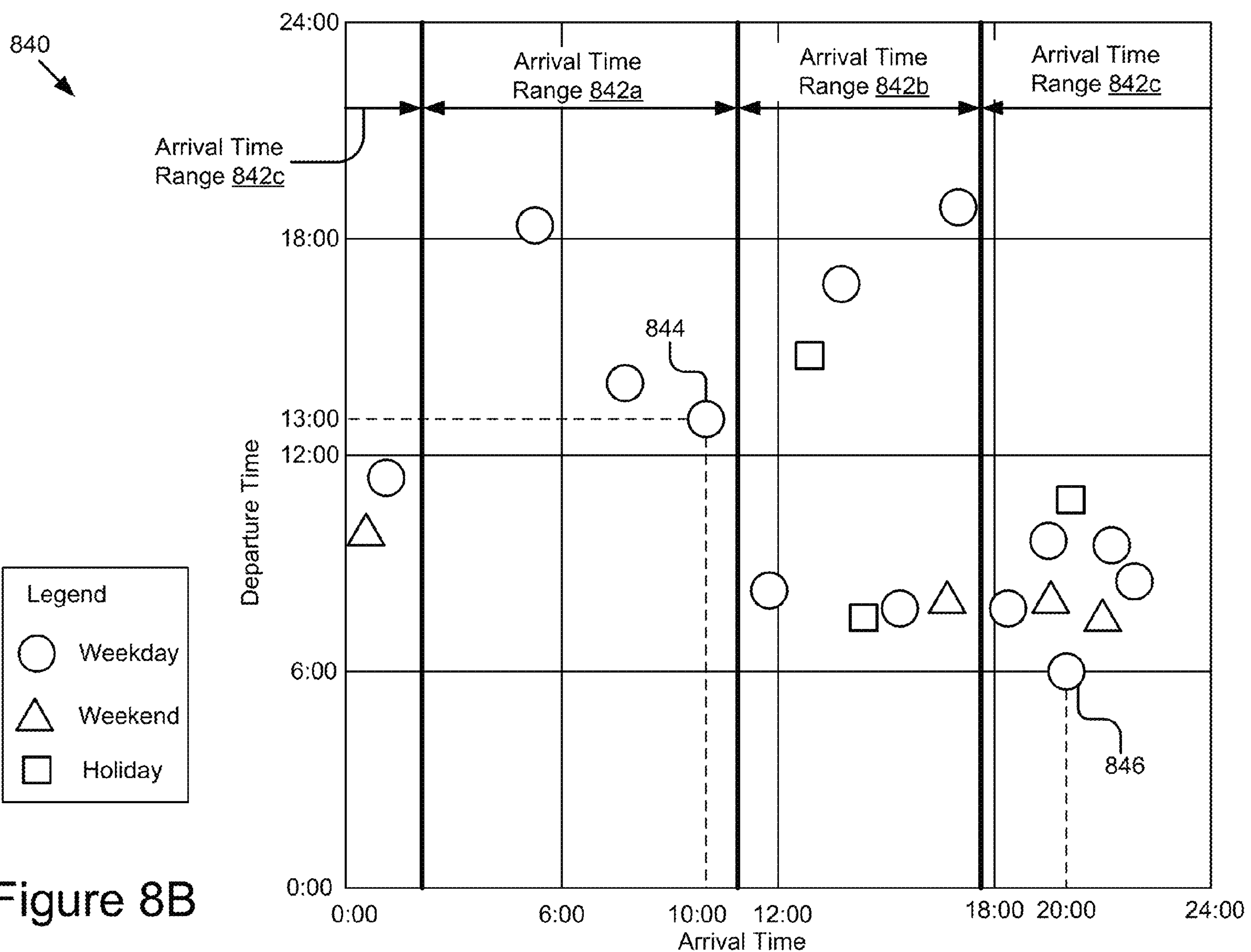
FIG. 8B is a graphic representation illustrating an example graphic showing a relationship between vehicle arrival times and vehicle departure times.

For example, referring to FIG. 8B, the distribution determination module 205 plots various time pairs of arrival times and departure times associated with weekdays, weekends, or holidays as points in the 2D coordinate system. For example, a point 844 indicates that the vehicle arrived at the destination location at 10:00 and then departed from the destination location at 13:00 of the same day. A point 846 indicates that the vehicle arrived at the destination location at 20:00 and then departed from the destination location at 6:00 of the next morning. The distribution determination module 205 determines: (1) a first arrival time range 842*a* that corresponds to a first departure time range describing that the vehicle will depart from the destination location within a first predetermined time window after arrival (e.g., the vehicle will depart within the next several hours); (2) a second arrival time range 842*b* that corresponds to a second departure time range indicating uncertainty of the departure time (e.g., the vehicle may depart within the next several hours in the same day or will not depart until the next morning); and (3) a third arrival time rage 842*c* that corresponds to a third departure time range describing that the vehicle will depart from the destination location after a second predetermined time window (e.g., the vehicle will depart in the next morning). The distribution determination module 205 generates a distribution pattern describing associations between the arrival time ranges 842*a*, 842*b*, 842*c* and the departure time ranges.

In some implementations, a distribution pattern includes data describing a probability density distribution of the arrival time and the departure time. For example, a distribution pattern describes a joint probability density distribution of the arrival time and the departure time. In another example, a distribution pattern describes a conditional probability of the departure time based on the arrival time. In some examples, the probability density distribution can be organized in a tabular format and referred to as a probability density distribution table. An example probability density distribution table is illustrated with reference to FIG. 8C. In some other examples, the probability density distribution can be stored using a matrix or other data structure.

In some implementations, the distribution determination module 205 applies various estimation mechanisms to create a distribution pattern (e.g., a probability density distribution table) based in part on the historical arrival times and historical departure times. Example estimation mechanisms include, but are not limited to, a Gaussian kernel density estimation (KDE) method and other kernel density estimation (KDE) methods, etc. For each vehicle, the distribution determination module 205 can create one or more probability density distribution tables associated with a destination location. For example, for each vehicle and each destination location, the distribution determination module 205 creates a first probability density distribution table for weekdays, a second probability density distribution table for weekends, and a third probability density distribution table for holidays.

In some implementations, the distribution determination module 205 sends data describing a distribution pattern to one or more of the departure estimation module 206 and the function determination module 210. In some implementations, the distribution determination module 205 stores the distribution pattern in the storage 241.

The departure estimation module 206 can be software including routines for estimating departure time data. In some implementations, the departure estimation module 206 can be a set of instructions executable by the processor 225 to provide the functionality described below for estimating departure time data. In some implementations, the departure estimation module 206 can be stored in the memory 227 of the computing device 200 and can be accessible and executable by the processor 225. The departure estimation module 206 may be adapted for cooperation and communication with the processor 225 and other components of the computing device 200 via signal line 226.

The departure estimation module 206 receives data describing a synchronized arrival time describing when a vehicle arrived at a destination location from the arrival determination module 204. The departure estimation module 206 determines an arrival day associated with the synchronized arrival time. For example, the departure estimation module 206 determines whether the arrival day is a weekday, a weekend, or a holiday. The departure estimation module 206 receives data describing the vehicle's distribution pattern associated with the arrival day and the destination location from the distribution determination module 205 or the storage 241. The departure estimation module 206 estimates departure time data for the vehicle based in part on the synchronized arrival time and the distribution pattern as described below.

In some implementations, the departure time data includes an estimated departure time describing when the vehicle departs from the destination location. The departure estimation module 206 estimates the departure time for the vehicle based in part on the synchronized arrival time and the distribution pattern. For example, the departure estimation module 206 determines possible departure times associated with the synchronized arrival time based in part on the distribution pattern. The departure estimation module 206 estimates the departure time as a frequent departure time among all the possible departure times. For example, the estimated departure time can be the most frequent departure time among all the possible departure times based on the synchronized arrival time.

In another example, assume the distribution pattern includes a probability density distribution table. Given that the arrival time is equal to the synchronized arrival time, the departure estimation module 206 determines a conditional probability of the departure time based on the probability density distribution table. For example, the departure estimation module 206 uses Bayesian estimation methods to determine the conditional probability of the departure time given the synchronized arrival time. The departure estimation module 206 estimates the departure time as a departure time value having the highest conditional probability value given the synchronized arrival time.

In some other implementations, the departure time data includes data describing an estimated departure time range associated with the synchronized arrival time. A departure time of the vehicle satisfies the estimated departure time range. The departure estimation module 406 estimates the departure time range associated with the synchronized arrival time based in part on the distribution pattern. For example, the departure estimation module 206 determines a first arrival time range associated with the synchronized arrival time from the distribution pattern, and determines a first departure time range associated with the first arrival time range based in part on the distribution pattern. The departure estimation module 206 estimates the departure time range for the vehicle as the first departure time range associated with the first arrival time range.

In a further example, assume the synchronized arrival time is 9:00. A distribution pattern indicates that when a vehicle arrives at a destination location within an arrival time range 8:00-14:00, the vehicle will depart from the destination location within 4-6 hours upon arrival. Since the synchronized arrival time 9:00 falls within the arrival time range 8:00-14:00, the departure estimation module 206 estimates a departure time range for the vehicle that describes the vehicle will depart from the destination location within 4-6 hours upon arrival.

In another example, assume the synchronized arrival time is 15:00. A distribution pattern indicates that when a vehicle arrives at a destination location within an arrival time range 14:00-20:00, the vehicle sometimes departs from the destination location within 2-3 hours upon arrival and sometimes does not depart from the destination location until 6:00 in the next morning. Since the synchronized arrival time 15:00 falls within the arrival time range 14:00-20:00, the departure estimation module 206 estimates a departure time range for the vehicle that describes the departure time for the vehicle is uncertain. For example, the estimated departure time range indicates that the vehicle may depart from the destination location within 2-3 hours upon arrival or may not depart from the destination location until 6:00 in the next morning.

In yet another example, assume the synchronized arrival time is 21:30. A distribution pattern associated with a vehicle indicates that when the vehicle arrives at a destination location within an arrival time range 21:00-24:00, the vehicle will depart from the destination location after 7:00 in the next morning. Since the synchronized arrival time 21:30 falls within the arrival time range 21:00-24:00, the departure estimation module 206 estimates a departure time range for the vehicle that describes the vehicle will depart from the destination location after 7:00 in next morning.

In some implementations, the estimated departure time range indicates that the vehicle will depart from the destination location after a predetermined time window (e.g., the vehicle will depart after 7:00 AM in the next morning). The departure estimation module 206 estimates a departure time for the vehicle that satisfies the departure time range based in part on the distribution pattern. For example, the departure estimation module 206 estimates a departure time as one of: (1) a most frequent departure time satisfying the departure time range; and (2) an earliest departure time satisfying the departure time range. In a further example, assume the departure time range indicates the vehicle will depart after 7:00 AM in the next morning. The distribution pattern indicates the vehicle usually departs at 8:00 AM and occasionally departs at 7:00 AM or 9:00 AM. The departure estimation module 206 can estimate the departure time for the vehicle as the frequent departure time 8:00 AM or the earliest departure time 7:00 AM satisfying the departure time range.

In some implementations, the departure estimation module 206 receives weather data from the weather server 153, calendar data from the calendar server 151, and user profile data from the social network server 155. The departure estimation module 206 determines the departure time data further based in part on one or more of the weather data, the calendar data, and the user profile data. For example, assume the weather data indicates a snowstorm is coming in one hour and will last until midnight. The calendar data indicates the user does not have events or appointments for the rest of the day. The departure estimation module 206 determines that the user may stay home for the rest of the day and estimates a departure time range for the user's vehicle describing that the vehicle may depart from home in the next morning based in part on the weather data and the calendar data.

In some implementations, the departure estimation module 206 sends the departure time data describing the estimated departure time range or the estimated departure time to the function determination module 210. In some implementations, the departure estimation module 206 stores the departure time data in the storage 241.

The DR event analysis module 208 can be software including routines for analyzing DR events. In some implementations, the DR event analysis module 208 can be a set of instructions executable by the processor 225 to provide the functionality described below for analyzing DR events. In some implementations, the DR event analysis module 208 can be stored in the memory 227 of the computing device 200 and can be accessible and executable by the processor 225. The DR event analysis module 208 may be adapted for cooperation and communication with the processor 225 and other components of the computing device 200 via signal line 228.

The DR event analysis module 208 receives DR event data describing one or more DR events from the DR event notification application 111. The DR event analysis module 208 analyzes the DR event data to determine one or more DR requirements. For example, the DR event analysis module 208 analyzes the DR event data to determine that power usage at a destination location cannot exceed a certain amount of electricity between 20:00 and 24:00. In another example, the DR event analysis module 208 analyzes the DR event data to determine that power usage at a destination location needs to be minimized before midnight. Other example DR requirements are possible.

The DR event analysis module 208 sends the DR requirements to the function determination module 210. In some implementations, the DR event analysis module 208 stores the DR event data and the DR requirements in the memory 227 or the storage 241.

The function determination module 210 can be software including routines for determining one or more vehicle functions for a vehicle. In some implementations, the function determination module 210 can be a set of instructions executable by the processor 225 to provide the functionality described below for determining one or more vehicle functions for a vehicle. In some implementations, the function determination module 210 can be stored in the memory 227 of the computing device 200 and can be accessible and executable by the processor 225. The function determination module 210 may be adapted for cooperation and communication with the processor 225 and other components of the computing device 200 via signal line 230.

The function determination module 210 receives a synchronized arrival time from the arrival determination module 204. The function determination module 210 determines one or more vehicle functions to be performed at the destination location based in part on the synchronized arrival time. For example, the function determination module 210 instructs the departure estimation module 206 to estimate departure time data based in part on the synchronized arrival time and receives the departure time data from the departure estimation module 206. The function determination module 210 determines one or more functions based in part on the departure time data. For example, assume the departure time data includes an estimated departure time. The function determination module 210 determines to perform temperature control in the vehicle and to transfer data between the vehicle and a server before the estimated departure time. The vehicle determination module 210 generates a notification describing the one or more vehicle functions to be performed and sends the notification to the user interface module 216 for presentation to a user.

In some implementations, the departure time data includes an estimated departure time range. If the estimated departure time range indicates uncertainty of vehicle departure time from the destination location, the function determination module 210 determines to perform one or more vehicle functions immediately in order to minimize failure of the performance of the one or more vehicle functions due to time shortage. For example, if the departure time of the vehicle is uncertain (e.g., the vehicle may depart within the next several hours or may depart in the next morning), the function determination module 210 determines to charge the vehicle immediately in case that the vehicle may depart within the next several hours. The function determination module 210 sends an immediate decision signal to the function implementation module 214 for performing the one or more vehicle functions immediately. In some examples, a user can decide whether to perform the one or more vehicle functions immediately or not. For example, a user can instruct the function determination module 210 to delay the performance of the one or more vehicle functions by setting a charging preference for the vehicle.

If the estimated departure time range indicates the vehicle will depart within a first predetermined time window, the function determination module 210 determines to perform one or more vehicle functions immediately. For example, if the estimated departure time range indicates the vehicle will depart within the next three hours, the function determination module 210 determines to charge the vehicle immediately. The function determination module 210 sends an immediate decision signal to the function implementation module 214 for performing the one or more vehicle functions immediately.

If the estimated departure time range indicates the vehicle will depart after a second predetermined time window, the function determination module 210 instructs the departure estimation module 206 to estimate a departure time for the vehicle that satisfies the departure time range. For example, if the vehicle will depart after 7:00 AM in the next morning, the function determination module 210 instructs the departure estimation module 206 to determine a departure time for the vehicle, where the departure time can be a frequent departure time 8:15 AM describing when the vehicle frequently departs from the destination location or an earliest departure time 7:00 AM satisfying the departure time range.

The function determination module 210 determines one or more schemes to perform one or more vehicle functions based in part on the estimated departure time. For example, the function determination module 210 generates a temperature control scheme to start controlling temperature in the vehicle at 10 minutes before the estimated departure time. In another example, the function determination module 210 generates a data scheme to transfer data between the vehicle and a server at 5:00 AM-5:30 AM when network traffic is low before the estimated departure time. In yet another example, the function determination module 210 controls charge of the vehicle based in part on the estimated departure time. The function determination module 210 can include a charging determination module 212 for controlling the charge of the vehicle as described below in more detail.

In some implementations, the function determination module 210 receives user preference data from the social network server 155 and determines one or more vehicle functions further based in part on the user preference data. For example, if the user preference data indicates a preference to charge the vehicle as soon as the vehicle arrives at the destination location, the function determination module 210 may instruct the function implementation module 214 to charge the vehicle immediately upon arrival of the vehicle. In another example, if the user preference data indicates a preference to charge the vehicle when the power rates satisfy a threshold, the function determination module 210 may instruct the charging determination module 212 to determine charging time slots that have power rates satisfying the threshold for charging the vehicle.

The charging determination module 212 can be software including routines for controlling charge of a vehicle. In some implementations, the charging determination module 212 can be a component of the function determination module 210. In some other implementations, the charging determination module 212 can be a component separate from the function determination module 210.

The charging determination module 212 receives an estimated departure time for a vehicle from the function determination module 210 or the departure estimation module 206. The estimated departure time satisfies a departure time range indicating the vehicle will depart after a predetermined time window (e.g., the vehicle will depart after 7:00 AM in the next morning). The charging determination module 212 determines a charging completion time based in part on the estimated departure time. For example, the charging determination module 212 determines a charging completion time which is 30 minutes earlier than the estimated departure time. A charging completion time can be a time when a vehicle completes charging. In some examples, a charging completion time can be a time before the estimated departure time. In some other examples, a charging completion time can be the same as the estimated departure time.

The charging determination module 212 receives data describing one or more DR requirements from the DR event analysis module 208. The charging determination module 212 determines available time slots for charging the vehicle based in part on the one or more DR requirements and the charging completion time. For example, the charging determination module 212 determines a set of time slots between a charging connection start time and the charging completion time, determines a subset of time slots that are not available for charging the vehicle based in part on the DR requirements and determines available time slots by excluding the subset of time slots from the set of time slots. A charging connection start time can be a time describing when a charging connection between a vehicle and a power source starts to establish.

The charging determination module 212 determines a target state of charge for one or more batteries of the vehicle based in part on the user's journey data. For example, if the user's journey data indicates the user usually drives the vehicle for no more than three hours a day, the charging determination module 212 determines a target state of charge for the batteries that can last at least a 3-hour drive of the vehicle.

The charging determination module 212 retrieves price data describing power rates for the available time slots from a power service server (not pictured) via the network 105. The charging determination module 212 determines one or more charging time slots from the available time slots based in part on the price data and the target state of charge. For example, the charging determination module 212 arranges the available time slots according to an ascending order of associated power rates. The charging determination module 212 selects one or more charging time slots that have the lowest power rates and also fulfill the target state of charge for the batteries. In a further example, the charging determination module 212 determines that four time slots are needed to charge the batteries from a current state of charge to the target state of charge. Therefore, the charging determination module 212 selects four charging time slots having lowest power rates from the available time slots. If two or more available time slots are associated with the same power rate, the charging determination module 212 may prioritize an earlier time slot over a later time slot for the selection of charging time slots.

The charging determination module 212 assigns the one or more charging time slots to the vehicle so that the vehicle can be charged at the one or more charging time slots. In some implementations, the charging determination module 212 sends the one or more charging time slots to the function implementation module 214. In some other implementations, the charging determination module 212 stores the one or more charging time slots in the storage 241.

The function implementation module 214 can be software including routines for implementing one or more vehicle functions. In some implementations, the function implementation module 214 can be a set of instructions executable by the processor 225 to provide the functionality described below for implementing one or more vehicle functions. In some implementations, the function implementation module 214 can be stored in the memory 227 of the computing device 200 and can be accessible and executable by the processor 225. The function implementation module 214 may be adapted for cooperation and communication with the processor 225 and other components of the computing device 200 via signal line 232.

In some implementations, the function implementation module 214 implements one or more vehicle functions immediately responsive to receiving an immediate decision signal from the function determination module 210. In some implementations, the function implementation module 214 implements one or more vehicle functions according to one or more schemes determined by the function determination module 210. For example, the function implementation module 214 starts controlling temperature in the vehicle in 10 minutes before the estimated departure time according to a temperature control scheme determined by the function determination module 210. In another example, the function implementation module 214 transfers data between the vehicle and a server at 5:00 AM-5:30 AM when network traffic is low according to a data scheme. In yet another example, the function implementation module 214 charges the vehicle according to one or more charging time slots determined by the charging determination module 212.

The user interface module 216 can be software including routines for generating graphical data for providing user interfaces. In some implementations, the user interface module 216 can be a set of instructions executable by the processor 225 to provide the functionality described below for generating graphical data for providing user interfaces. In some implementations, the user interface module 216 can be stored in the memory 227 of the computing device 200 and can be accessible and executable by the processor 225. The user interface module 216 may be adapted for cooperation and communication with the processor 225 and other components of the computing device 200 via signal line 234.

In some implementations, the user interface module 216 generates graphical data for providing a user interface that displays one or more charging time slots to a user. An example user interface for displaying charging time slots is illustrated with reference to FIG. 8A. In some implementations, the user interface module 216 receives a notification describing a vehicle function to be performed for a vehicle from the function determination module 210, and generates graphical data for providing a user interface that depicts the notification. The user interface module 216 sends the graphical data to a client device 103 (e.g., a smartphone, a tablet, etc.), causing the client device 103 to display the user interface to the user. The user interface module 216 may generate graphical data for providing other user interfaces to users.

Methods

Figure 3:
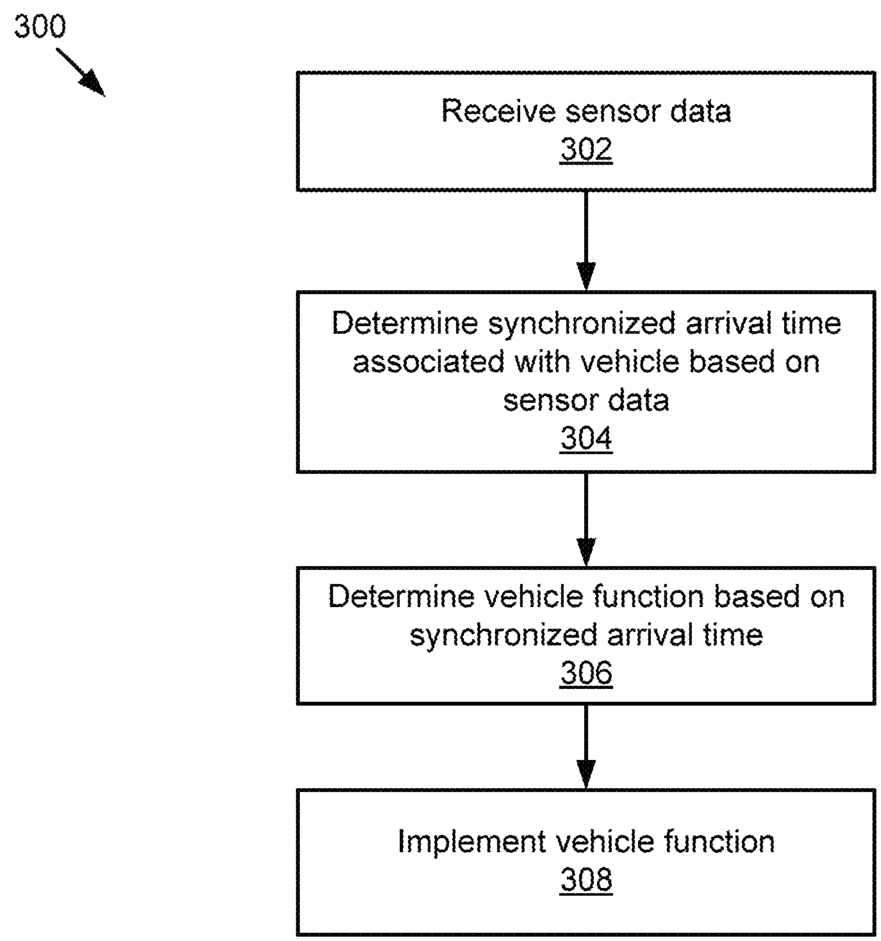
FIG. 3 is a flowchart of an example method for performing one or more vehicle functions.

Referring now to FIG. 3, an example of a method 300 for performing one or more vehicle functions is described. The communication module 202 receives 302 sensor data from one or more sensors 135. For example, the communication module 202 receives GPS data from a GPS sensor. The sensor data describes a vehicle has arrived at a destination location. The arrival determination module 204 determines 304 a synchronized arrival time describing when the vehicle arrived at the destination location based in part on the sensor data. The function determination module 210 determines 306 one or more vehicle functions to be performed at the destination location based in part on the synchronized arrival time. The function implementation module 214 implements 308 the one or more vehicle functions. For example, the charging determination module 212 to determine one or more charging time slots for charging the vehicle, and the function implementation module 214 charges the vehicle according to the one or more charging time slots.

Figure 4:
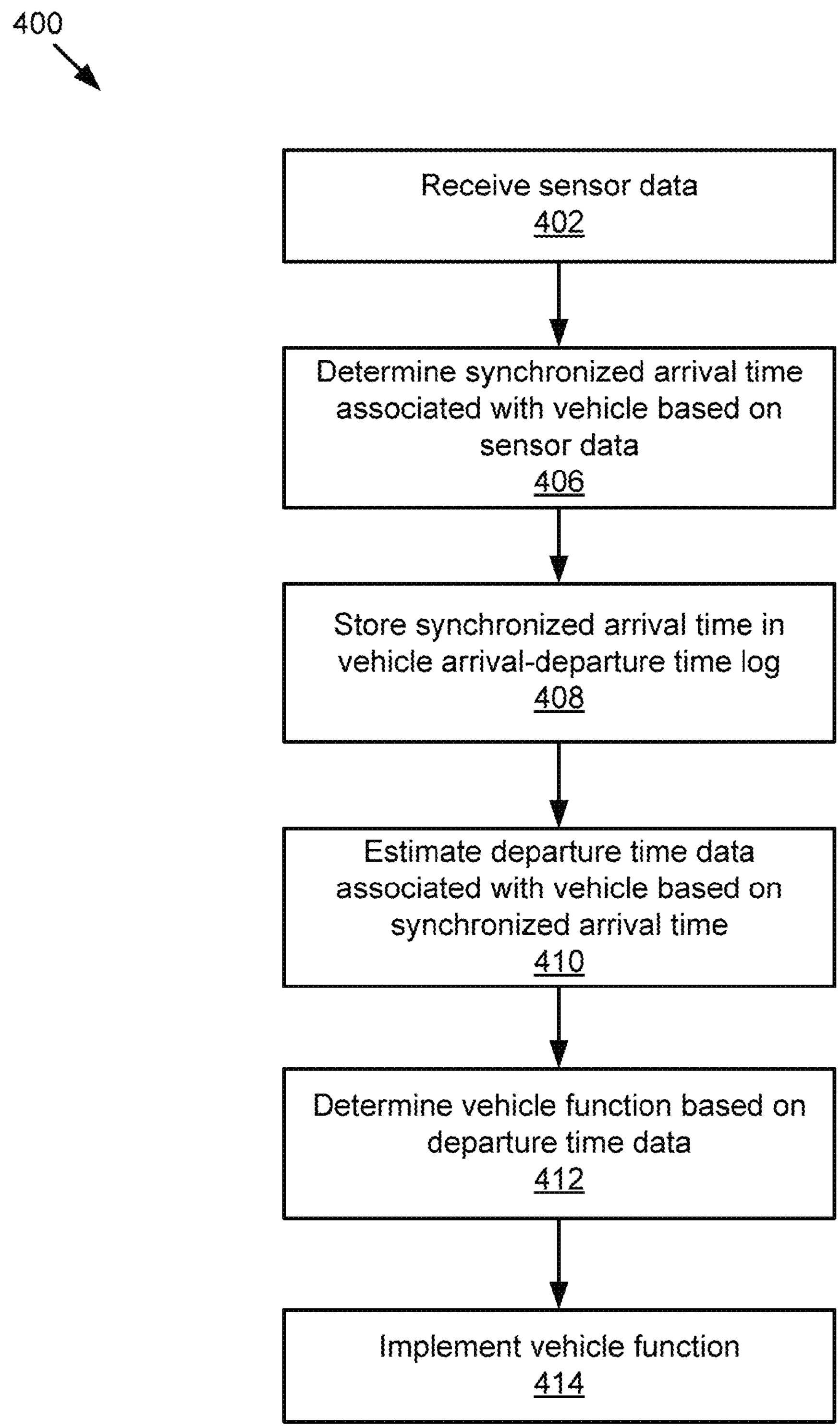
FIG. 4 is a flowchart of another example method for performing one or more vehicle functions.

FIG. 4 is a flowchart of another example method 400 for performing one or more vehicle functions. The communication module 202 receives 402 sensor data from one or more sensors 135. The arrival determination module 204 determines 406 a synchronized arrival time describing when a vehicle arrived at a destination location based in part on the sensor data. The arrival determination module 204 stores 408 the synchronized arrival time in the vehicle arrival-departure time log 299. The departure estimation module 206 estimates 410 departure time data associated with the vehicle based in part on the synchronized arrival time. In some implementations, the departure time data includes an estimated departure time describing when the vehicle may depart from the destination location. In some implementations, the departure time data includes a departure time range. An example method 410 for estimating the departure time data is illustrated with reference to FIG. 5.

The function determination module 210 determines 412 one or more vehicle functions associated with the vehicle based in part on the departure time data. An example method 412 for determining one or more vehicle functions is illustrated with reference to FIG. 6. The function implementation module 214 implements 414 the one or more vehicle functions.

Figure 5:
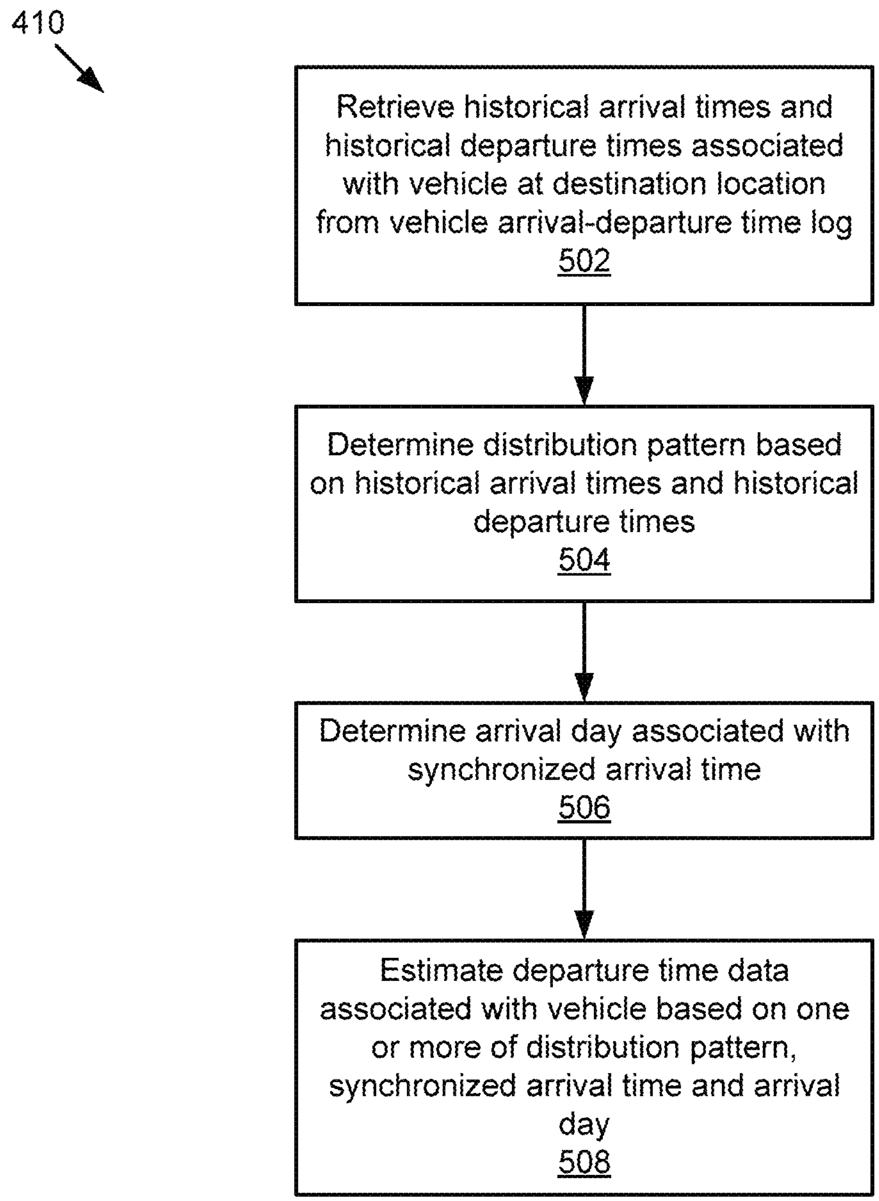
FIG. 5 is a flowchart of an example method for estimating vehicle departure time data.

FIG. 5 is a flowchart of an example method 410 for estimating vehicle departure time data. The communication module 202 retrieves 502 historical arrival times and historical departure times associated with a vehicle and a destination location from the vehicle arrival-departure time log 299. The distribution determination module 205 determines 504 a distribution pattern associated with the destination location and the vehicle based in part on the historical arrival times and the historical departure times. For example, a distribution pattern includes a probability density distribution table. In another example, a distribution pattern includes data describing associations between arrival time ranges and departure time ranges.

The departure estimation module 206 determines 506 an arrival day associated with a synchronized arrival time. For example, the synchronized arrival time can be a current arrival time or the most recent arrival time. An arrival day can be a weekday, a weekend, or a holiday, etc. The departure estimation module 206 estimates 508 departure time data associated with the vehicle based in part on one or more of the distribution pattern, the arrival day, and the synchronized arrival time. For example, the departure estimation module 206 retrieves a distribution pattern associated with the arrival day from the distribution determination module 205 or the storage 241, and determines the departure time data based in part on the distribution pattern and the synchronized arrival time.

Figure 6:
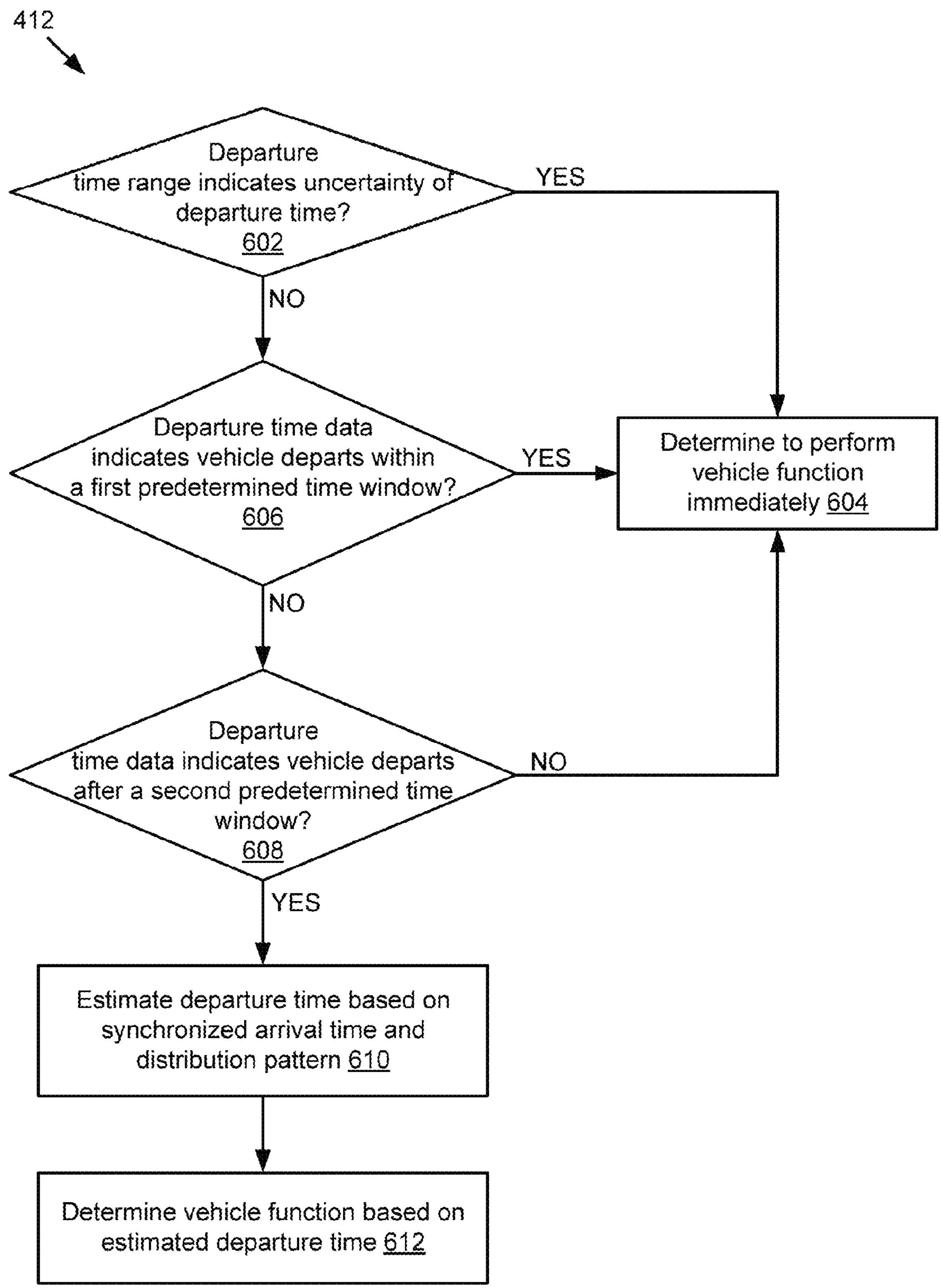
FIG. 6 is a flowchart of an example method for determining one or more vehicle functions.

FIG. 6 is a flowchart of an example method 412 for determining one or more vehicle functions. In some implementations, the departure time data includes a departure time range for a vehicle. The function determination module 210 determines 602 whether the departure time range indicates uncertainty of a vehicle departure time. For example, the departure time range indicates it is unclear whether the vehicle may depart from a destination location in the next few hours or in the next morning. If the departure time range indicates uncertainty of the vehicle departure time, the method 412 moves to block 604. Otherwise, the method 412 moves to block 606. At block 604, the function determination module 210 determines to perform one or more vehicle functions immediately upon arrival of the vehicle at the destination location.

At block 606, the function determination module 210 determines whether the departure time range indicates the vehicle may depart within a first predetermined time window. For example, the function determination module 210 determines whether the departure time range indicates the vehicle will depart in the next four hours. If the departure time range indicates the vehicle may depart within the first predetermined time window, the method 412 moves to block 604. Otherwise, the method 412 moves to block 608.

At block 608, the function determination module 210 determines whether the departure time range indicates the vehicle may depart after a second predetermined time window. For example, the function determination module 210 determines whether the departure time range indicates the vehicle will depart after 7:00 AM in the next morning. If the departure time range indicates the vehicle may depart after the second predetermined time window, the method 412 moves to block 610. Otherwise, the method 412 moves to block 604.

At block 610, the departure estimation module 206 estimates a departure time satisfying the departure time range based in part on the synchronized arrival time and the distribution pattern. For example, the estimated departure time can be a most frequent departure time or an earliest departure time satisfying the departure time range. The function determination module 210 determines 612 one or more vehicle functions based in part on the estimated departure time. The one or more vehicle functions can include charging the vehicle. An example method for controlling charge of the vehicle based in part on the estimated departure time is illustrated with reference to FIG. 7.

Figure 7:
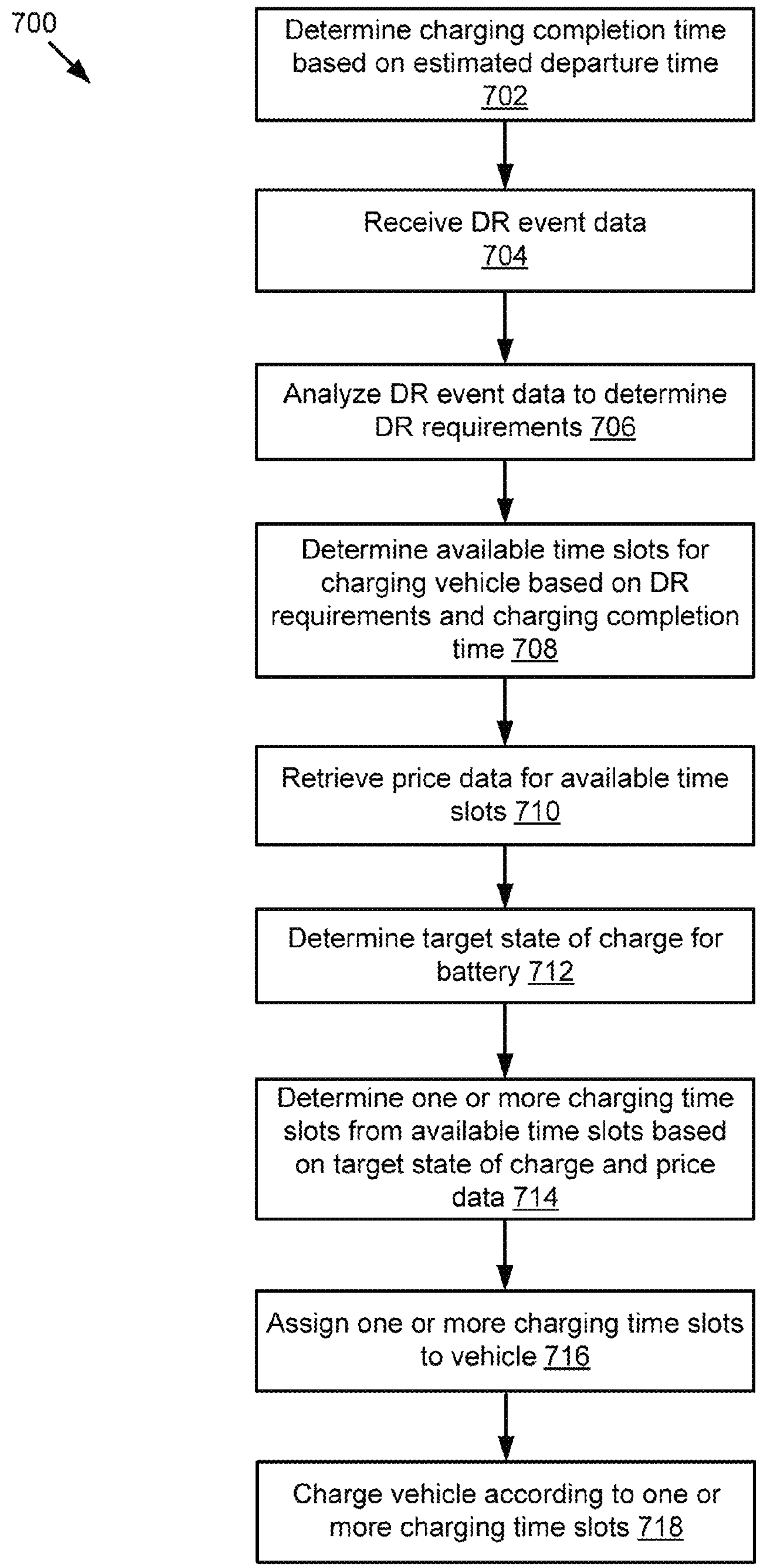
FIG. 7 is a flowchart of an example method for controlling charge of a vehicle.

FIG. 7 is a flowchart of an example method 700 for controlling charge of a vehicle. The charging determination module 212 determines 702 a charging completion time based in part on an estimated departure time. The charging determination module 212 receives 704 DR event data from the DR event notification application 111. The charging determination module 212 analyzes 706 the DR event data to determine one or more DR requirements. The charging determination module 212 determines 708 available time slots for charging the vehicle based in part on the one or more DR requirements and the charging completion time.

The communication module 202 retrieves 710 price data describing power rates for the available time slots from a power service server (not pictured). The charging determination module 212 determines 712 a target state of charge for one or more batteries in the vehicle. The charging determination module 212 determines 714 one or more charging time slots from the available time slots based in part on the target state of charge and the price data. The charging determination module 212 assigns 716 the one or more charging time slots to the vehicle. The function implementation module 214 charges 718 the vehicle according to the one or more charging time slots.

Graphic Representations

FIG. 8A is a graphic representation 800 illustrating example charging time slots 802*a*, 802*b*. The graphic representation 800 depicts a charging connection start time 804 (e.g., 17:00) and an estimated vehicle departure time 806 (e.g., 8:00 in the next morning). The charging determination module 212 determines available time slots 808*a* and 808*b* and unavailable time slots 810. The time slots 810 are not available for charging the vehicle due to DR requirements. The charging determination module 212 determines the charging time slots 802*a*, 802*b* that have the lowest prices from the available time slots 808*a*, 808*b*.

FIG. 8B is a graphic representation 840 illustrating an example of a distribution graphic. The example distribution graphic illustrates relationship between vehicle arrival times and vehicle departure times. FIG. 8B is described above and the description will not be repeated here.

FIG. 8C is a graphic representation 880 illustrating an example probability density distribution table. The example probability density distribution table describes a joint probability distribution of the arrival time and the departure time. For example, a value 882 indicates that a joint probability distribution has a value of 0.36 when the arrival time is within 18:00-24:00 and the departure time is within 6:00-12:00 of the next morning.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to “some implementations” or “some instances” means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:

receiving sensor data indicating that a vehicle has arrived at a destination location;

determining a synchronized arrival time describing when the vehicle arrived at the destination location, the synchronized arrival time determined based in part on the sensor data;

determining one or more vehicle functions associated with the vehicle based in part on the synchronized arrival time;

wherein determining the one or more vehicle functions based in part on the synchronized arrival time comprises:

estimating departure time data including a departure time range associated with the vehicle based in part on the synchronized arrival time, wherein the departure time range indicates an uncertainty of the vehicle departure time; and determining the one or more vehicle functions based in part on the departure time range indicating the uncertainty of the vehicle departure time; and executing at least one of the one or more vehicle functions.

2. The method of claim 1, wherein, responsive to the departure time range indicating uncertainty of the vehicle departure time, the at least one vehicle function is executed substantially immediately in order to minimize a risk of failure to execute the at least one vehicle function due to a time shortage.

3. The method of claim 2, wherein estimating the departure time data based in part on the synchronized arrival time comprises:

determining a distribution pattern describing a relationship between arrival times and departure times; and estimating the departure time data based in part on the distribution pattern and the synchronized arrival time.

4. The method of claim 3, wherein the distribution pattern includes a probability density distribution table.

5. The method of claim 1, further comprising:

determining a user preference based on the departure time range indicating an uncertainty of the vehicle departure time, wherein the user preference describes a timing for executing the one or more vehicle functions; and wherein the at least one vehicle function is executed in conformity to the user preference.

6. The method of claim 5, wherein the user preference is described by user profile data provided by a social network server that hosts a social network service and the user preference indicates that the user prefers to charge the vehicle as soon as the vehicle arrives at the destination location and the at least one vehicle function is executed substantially immediately.

7. The method of claim 1, further comprising generating graphical data for providing a user interface that depicts a notification describing the vehicle function to the user and a time slot for performance of the vehicle function and providing the graphical data to a client device that displays the user interface on a display of the client device.

8. The method of claim 7, wherein the one or more vehicle functions include charging the vehicle, and determining the one or more vehicle functions comprises:

determining a charging completion time as a time before the estimated departure time;

receiving DR event data;

analyzing the DR event data to determine one or more DR requirements;

determining available time slots for charging the vehicle based in part on the one or more DR requirements and the charging completion time;

retrieving price data associated with the available time slots;

determining a target state of charge for a battery associated with the vehicle;

selecting one or more charging time slots from the available time slots based in part on the target state of charge and the price data; and assigning the one or more charging time slots to the vehicle.

9. The method of claim 1, wherein the one or more vehicle functions include one or more of charging the vehicle, controlling temperature in the vehicle, transferring data between the vehicle and a server, and transferring data between the vehicle and a client device.

10. A computer program product comprising a non-transitory computer-usable medium including a computer-readable program, wherein the computer-readable program when executed on a computer causes the computer to:

receive sensor data indicating that a vehicle has arrived at a destination location;

determine a synchronized arrival time describing when the vehicle arrived at the destination location, the synchronized arrival time determined based in part on the sensor data;

determine an arrival day associated with the synchronized arrival time, wherein the arrival day may be a weekday, weekend or a holiday;

determine one or more vehicle functions associated with the vehicle based in part on the synchronized arrival time and the arrival day;

wherein determining the one or more vehicle functions based in part on the synchronized arrival time and the arrival day comprises:

selecting, based on the arrival day, a distribution pattern from a set of distribution patterns describing relationships between arrival times and departure times, wherein the departure time varies based on the arrival day and the set includes (1) a first distribution pattern for weekdays, (2) a second distribution pattern for weekends and (3) a third distribution pattern for holidays, wherein the distribution pattern is selected from the set based on a correspondence between the arrival day and the selected distribution pattern;

estimating the departure time data based in part on the selected distribution pattern, the arrival day and the synchronized arrival time; and determining the one or more vehicle functions based in part on the departure time data; and executing at least one of the one or more vehicle functions determined based in part on the departure time data.

11. The computer program product of claim 10, wherein if the arrival day corresponds to both (1) a holiday and (2) a weekday or a weekend, the selected distribution pattern is the third distribution pattern for holidays.

12. The computer program product of claim 10, wherein the holidays for a user of the vehicle are based on user profile data provided by a social network server communicatively coupled to the vehicle via a network to provide a social network service for the user.

13. The computer program product of claim 12, wherein the distribution pattern includes a probability density distribution table.

14. The computer program product of claim 11, wherein the departure time data includes a departure time range.

15. The computer program product of claim 14, wherein determining the one or more vehicle functions based in part on the departure time data comprises:

determining that the departure time range indicates the vehicle departs from the destination location after a predetermined time window;

determining a distribution pattern describing a relationship between arrival times and departure times;

estimating a departure time satisfying the departure time range based in part on the synchronized arrival time and the distribution pattern; and determining the one or more vehicle functions to be performed at the destination location based in part on the estimated departure time.

16. The computer program product of claim 11, wherein the departure time data includes an estimated departure time describing when the vehicle departs from the destination location.

17. The computer program product of claim 16, wherein the one or more vehicle functions include charging the vehicle, and determining the one or more vehicle functions comprises:

determining a charging completion time as a time before the estimated departure time;

receiving DR event data;

analyzing the DR event data to determine one or more DR requirements;

determining available time slots for charging the vehicle based in part on the one or more DR requirements and the charging completion time;

retrieving price data associated with the available time slots;

determining a target state of charge for a battery associated with the vehicle;

selecting one or more charging time slots from the available time slots based in part on the target state of charge and the price data; and assigning the one or more charging time slots to the vehicle.

18. The computer program product of claim 10, wherein the one or more vehicle functions include one or more of charging the vehicle, controlling temperature in the vehicle, transferring data between the vehicle and a server, and transferring data between the vehicle and a client device.

19. A system comprising:

a processor; and a memory storing instructions that, when executed, cause the system to:

receive sensor data indicating that a vehicle has arrived at a destination location;

determine a synchronized arrival time describing when the vehicle arrived at the destination location, the synchronized arrival time determined based in part on the sensor data; and determine one or more vehicle functions associated with the vehicle based in part on the synchronized arrival time;

estimating a departure time for the vehicle;

determining one or more available time slots for providing the vehicle functions prior to the departure time;

generating graphical data for displaying the available time slots on a client device;

providing the graphical data to the client device;

receiving a user provided selection of one or more selected time slots for providing the vehicle functions prior to the departure time, wherein the selected time slots are selected from the available time slots by the user using the client device; and executing the vehicle functions during the selected time slots so that the vehicle functions are successfully completed prior to the departure time.

20. The system of claim 19, wherein the instructions when executed cause the system to determine the one or more vehicle functions based in part on the synchronized arrival time by:

estimating departure time data associated with the vehicle based in part on the synchronized arrival time; and determining the one or more vehicle functions based in part on the departure time data.

21. The system of claim 20, wherein the instructions when executed cause the system to estimate the departure time data based in part on the synchronized arrival time by:

determining a distribution pattern describing a relationship between arrival times and departure times; and estimating the departure time data based in part on the distribution pattern and the synchronized arrival time.

22. The system of claim 21, wherein the distribution pattern includes a probability density distribution table.

23. The system of claim 20, wherein the departure time data includes a departure time range.

24. The system of claim 23, wherein the instructions when executed cause the system to determine the one or more vehicle functions based in part on the departure time data by:

determining that the departure time range indicates the vehicle departs from the destination location after a predetermined time window;

determining a distribution pattern describing a relationship between arrival times and departure times;

estimating a departure time satisfying the departure time range based in part on the synchronized arrival time and the distribution pattern; and determining the one or more vehicle functions to be performed at the destination location based in part on the estimated departure time.

25. The system of claim 20, wherein the departure time data includes an estimated departure time describing when the vehicle departs from the destination location.

26. The system of claim 25, wherein the one or more vehicle functions include charging the vehicle, and wherein the instructions when executed cause the system to determine the one or more vehicle functions by:

determining a charging completion time as a time before the estimated departure time;

receiving DR event data;

analyzing the DR event data to determine one or more DR requirements;

determining available time slots for charging the vehicle based in part on the one or more DR requirements and the charging completion time;

retrieving price data associated with the available time slots;

determining a target state of charge for a battery associated with the vehicle;

selecting one or more charging time slots from the available time slots based in part on the target state of charge and the price data; and assigning the one or more charging time slots to the vehicle.

27. The system of claim 19, wherein the one or more vehicle functions include one or more of charging the vehicle, controlling temperature in the vehicle, transferring data between the vehicle and a server, and transferring data between the vehicle and a client device.

* * * * *